United States Patent [19]
Plechner

[11] Patent Number: 6,145,488
[45] Date of Patent: Nov. 14, 2000

[54] REDUCED VOLUME SCAVENGING SYSTEM FOR TWO CYCLE ENGINES

[75] Inventor: Richard A. Plechner, Shelton, Wash.

[73] Assignees: MPH Motors, Inc.; Miles Way Coyne, PLLC, both of Olympia, Wash.

[21] Appl. No.: 09/354,447

[22] Filed: Jul. 15, 1999

[51] Int. Cl.[7] ...................................................... F02B 33/14
[52] U.S. Cl. .................................. 123/193.1; 123/193.6; 123/73 F; 123/65 S; 123/193.2
[58] Field of Search ............................. 123/73 F, 73 FA, 123/73 AA, 73 C, 65 S, 65 P, 193.1, 193.2, 193.6, 193.4

[56] References Cited

U.S. PATENT DOCUMENTS

| | | | |
|---|---|---|---|
| 1,472,549 | 10/1923 | Burnett . | |
| 1,672,869 | 6/1928 | Buckman . | |
| 1,802,585 | 4/1931 | Stokes . | |
| 1,900,475 | 3/1933 | Winquist . | |
| 2,127,758 | 8/1938 | Schmitz . | |
| 2,923,281 | 2/1960 | De Martin | 123/73 F |
| 3,749,066 | 7/1973 | Cseh | 123/65.5 |
| 4,068,629 | 1/1978 | Hooper | 123/65 S |
| 4,481,909 | 11/1984 | Takada et al. | 123/73 F |
| 4,796,572 | 1/1989 | Heydrich | 123/193.2 |
| 5,724,933 | 3/1998 | Silvonen et al. | 123/193.6 |
| 5,857,450 | 1/1999 | Staerzl | 123/65 S |

*Primary Examiner*—Marguerite McMahon
*Attorney, Agent, or Firm*—Brian J. Coyne

[57] ABSTRACT

A reduced volume scavenging system for a two cycle engine embodying a duplex cylinder having an upper cylinder bore and a reduced-diameter lower cylinder bore. The lower bore communicates with a crankcase that houses a crankshaft, connecting rod(s) and engine lubricating oil. A fixed sleeve lines the upper cylinder bore and extends up into the cylinder head. A piston disposed for reciprocating motion within the fixed sleeve has an attached cylindrical, reciprocating sleeve that extends down into the lower cylinder bore and moves with the piston. The reciprocating sleeve has compression rings that seal the lower bore and the crankcase against blowyby gases that might contaminate the oil. The fixed sleeve has an intake opening in registry with an inlet port in the upper cylinder bore for admission of fresh air-fuel mixture. The fixed sleeve also has an exhaust opening diametrically opposite the intake opening and in registry with an exhaust port in the upper cylinder bore, as well as upper and lower pairs of scavenging openings in registry with transfer passageways recessed into the upper cylinder bore, such that each out stroke of the piston forces fresh air-fuel mixture through the passageways and into the combustion chamber to flush out burnt gases. This arrangement permits use of four cycle engine lubricating methods and apparatus in two cycle engines, without unduly adding to their weight and complexity, thereby reducing the emission of air pollutants and increasing engine life.

30 Claims, 16 Drawing Sheets

INTAKE/COMPRESSION

IGNITION

POWER

EXHAUST

SCAVENGING/EXHAUST

REDUCED VOLUME SCAVENGING SYSTEM FOR TWO CYCLE ENGINES

CROSS REFERENCE TO RELATED APPLICATIONS

None, however, Applicant filed Disclosure Document Number 447633 on Nov. 19, 1998, which document concerns this application; therefore, by separate paper it is respectfully requested that the document be retained and acknowledgement thereof made by the Examiner (MPEP 1706).

STATEMENT REGARDING FEDERALLY APPROVED RESEARCH OR DEVELOPMENT

Not applicable.

BACKGROUND OF THE INVENTION

1. Field of the Invention

This invention relates in general to two cycle internal combustion engines, and more particularly to systems and devices for scavenging combustion gases in, and for lubricating, such engines.

2. Background Art

The Otto cycle for reciprocating, internal combustion engines comprises five main events: power, exhaust, intake, compression and ignition. In a four-stroke-cycle engine ("four cycle engine"), these are distinct events, which are associated with the strokes of the piston(s) within the engine cylinder(s), as follows: (1) an intake stroke, wherein an air-fuel mixture enters an upper, combustion chamber portion of the cylinder(s); (2) a compression stroke, wherein the air-fuel mixture is compressed; (3) ignition; (4) the power stroke; and (5) an exhaust stroke; that is, it requires two crankshaft revolutions in a four cycle engine to complete one Otto cycle. Lubrication oil is supplied to the piston(s), cylinder(s), crankshaft and other moving engine parts from the crankcase, either by an oil pump or by an oil splash system that splashes crankcase oil up into the cylinder(s). Each piston is fitted with piston rings to substantially prevent contamination of the oil in the crankcase by combustion products ("blowby gases") created in the combustion chamber. Each cylinder of a four cycle engine is commonly equipped with spring loaded intake and exhaust valves located in the engine head and actuated through coupling elements by a cam shaft driven by the crankshaft.

The two-stroke-cycle engine ("two cycle engine") is so called because it requires only two full strokes (one complete crankshaft revolution) to accomplish the five main events of the Otto cycle. Unlike a four cycle engine, in a two cycle engine the five main events of the Otto cycle are not distinct. The first one is an out stroke; but this stroke is a power stroke (started by ignition) and it also accomplishes exhaust and part of intake. A second (in) stroke completes the cycle by finishing intake and accomplishing compression. As compression proceeds, ignition occurs and the following out stroke starts the next cycle. Neither intake nor exhaust require separate strokes, as they are accomplished during the power and compression strokes. Unlike in a four cycle engine, however, no intake or exhaust valve is required for these events to occur. Instead, each cylinder combustion chamber is provided with an inlet port A, for entry of fresh air-fuel mixture, and an outlet port B for discharge of burnt gases, and it is the reciprocating movement of the piston C itself that opens and closes these ports as the piston skirt cyclically and repeatedly covers and uncovers them; see FIGS. 1A–1E. Fresh air-fuel mixture, mixed with lubricating oil, is drawn directly into the crankcase E through a third port (intake port) D during the compression stroke. After ignition, the air-fuel/oil mixture in the crankcase is compressed by the descending piston during the power stroke. The descending piston pumps the air-fuel/oil mixture through the inlet port into the combustion chamber as first the exhaust port and later the inlet port are uncovered by the descending piston, thereby scavenging burnt gases from the combustion chamber while simultaneously lubricating the piston and upper cylinder.

Although this method of lubricating a two cycle engine has the virtue of simplicity compared to four cycle engines, it yields a relatively high level of air pollutants from the products of combustion, a relatively low engine life, and inadequate lubrication of crankshaft bearings (unless lubricating oil is pumped directly to the bearings, as in some Detroit Diesel service engines). Prior to my invention, however, there was no satisfactory way to achieve low pollutant levels and long engine life by using sump lubricating oil within the crankcase of a two cycle engine to lubricate the upper cylinder(s), combustion chamber(s) and piston(s), and without the lubricating oil interfering with combustion of the air-fuel mixture. E. A. Buckman et al., U.S. Pat. No. 1,672,869, disclosed a two cycle engine embodying a duplex piston having upper and lower portions of different external diameters, corresponding to the internal diameters of the sleeve valve, disposed for reciprocal motion within the sleeve valve. Air-fuel mixture was admitted to the cylinder through an intake port that communicated with the lower, larger diameter portion of the sleeve valve. An annular chamber for storage of air-fuel mixture was provided above and in communication with the larger bore of the sleeve valve. Peripheral channels on the upper, smaller portion of the sleeve valve afforded communication between the storage chamber and the larger portion of the valve, such that a charge of air-fuel mixture admitted to the larger bore could be transferred to the storage chamber and compressed during the upward movement of the piston. Providing suitable reciprocating linkages between the sleeve valve and the crankshaft, however, significantly added to the complexity and weight of the engine. A two cycle engine disclosed by C. L. Stokes, U.S. Pat. No. 1,802,585, embodying a cylinder having concentric upper and lower bores of different diameter, a duplex sleeve valve reciprocal therein and having cylindrical portions corresponding in diameter to the bores in the cylinder, and a piston (albeit, a non-duplex piston) reciprocal within an upper portion of the sleeve valve, likewise suffered from the same limitation: the necessity for additional linkages between the crankshaft and the sleeve valve to reciprocate the sleeve valve. So too, the two cycle engine disclosed by W. L. Schmitz, U.S. Pat. No. 2,127,758, employing a piston within a piston arrangement, one fitted to move axially within the other, whereby a combustion chamber is formed between the heads of the two pistons. Each of these approaches lost somewhat of the advantages of two cycle engines: i.e., their relative simplicity and low weight.

SUMMARY OF THE INVENTION

What is needed, therefore, and what my invention provides, is a reduced volume scavenging system for a modified form of a two cycle, internal combustion engine that permits the use of the same lubrication methods as are conventionally used in four cycle engines, and that eliminates the need for mixing lubricating oil with the fuel as has heretofore been the practice with two cycle engines. In this manner, low air pollutant levels and long engine life can be achieved to a degree heretofore impossible in two cycle engines.

The modified form of two cycle engine has an engine block enclosing a crankcase, and at least one cylinder within the block. Each cylinder has an upper cylinder bore in communication with a lower, reduced-diameter cylinder bore. Within the upper cylinder bore is an inlet port and an exhaust port disposed diametrically opposite the inlet port. The inlet port is flanked on opposite sides by two pairs of circumferentially spaced-apart, axially-extended, transfer port passageways for cross flow scavenging. A cylinder head is mounted over the engine block at an upper end of each cylinder. A crankshaft and connecting rod assembly is housed within the crankcase. A piston, disposed for reciprocating motion within each upper cylinder bore, is pivotally attached by a wrist pin to a connecting rod. The engine includes four cycle engine lubrication means; that is, either an oil sump and an oil pump within the crankcase; an oil sump and oil pump external to the crankcase, communicating with the interior of the crankcase; or an oil sump and an oil slinger attached to the crankshaft within the crankcase.

The air-fuel mixture must not be introduced into the crankcase because that would contaminate the air-fuel mixture with lubricating oil. Instead, an inlet port is provided in the cylinder wall located near the bottom of each cylinder combustion chamber for inlet of fresh air-fuel mixture. An exhaust port is provided for each cylinder combustion chamber, located in the cylinder wall opposite the inlet port, the exhaust port extending axially above the inlet port. Each cylinder exhaust port communicates with an exhaust duct for discharge of burnt gases to the atmosphere.

The reduced scavenging system comprises a fixed, cylinder sleeve within each cylinder bore, which serves as a barrier between the lubricating oil in the crankcase and the air-fuel mixture within the engine head. The sleeve includes an upper cylindrical extension that protrudes above the block and into the cylinder head. The cylindrical extension has a first set of ring grooves upon which are seated compression rings and an oil ring. The sleeve also includes a cylinder bore liner that is coaxial and integral with the upper cylindrical extension. The liner lines the upper cylinder bore. The liner has intake and exhaust openings and upper and lower scavenging openings in registry with the inlet and exhaust ports and with the transfer port passgeways of the cylinder, respectively. The sleeve further includes a reduced-diameter, lower cylinder bore extension that is coaxial with and attached to the liner. The lower cylindrical extension extends from inside a lower portion of the liner and downward into the lower cylinder bore. The sleeve further includes an upper, annular flange that is coaxial with, and attached to, an upper portion of the liner; and an annular base that is coaxial with, and attached to, a lower portion of the liner and to an intermediate portion of the lower cylinder bore extension. The upper flange is seated in an annular recess in an upper surface of the block and circumposed about the top of the upper cylinder bore.

The reduced scavenging system further includes a reciprocating sleeve attached by a wrist pin to the piston and to a connecting rod, and adapted for close fitting, reciprocating movement within the lower cylinder bore extension of the fixed sleeve; i.e., the external diameter of the reciprocating sleeve approximates the interior diameter of said extension. The reciprocating sleeve has a second set of ring grooves and a second set of compression and oil rings seated therein. In this manner, the combination of the piston, the reciprocating sleeve and the fixed sleeve prevents lubricating oil in the crankcase from interfering with combustion of the fuel-air mixture within the upper cylinder bore. Moreover, the same combination significantly reduces the volume of gases for scavenging. Whereas in two cycle engines of the prior art, each piston descending during a power stroke would partially compress the air-fuel mixture distributed throughout the entire crankcase, in my system a descending piston during a power stroke compresses only the volume of fresh air-fuel mixture between the piston and the annular base of the fixed sleeve directly below the piston skirt; this reduced volume is significantly less than the volume of the entire crankcase. This results in more efficient scavenging of gases through the engine. Other advantages achieved include increased fuel efficiency and, with optional turbocharging, increased power output or fuel efficiency for a given cylinder displacement.

DESCRIPTION OF THE PREFERRED EMBODIMENTS

Figure 2:
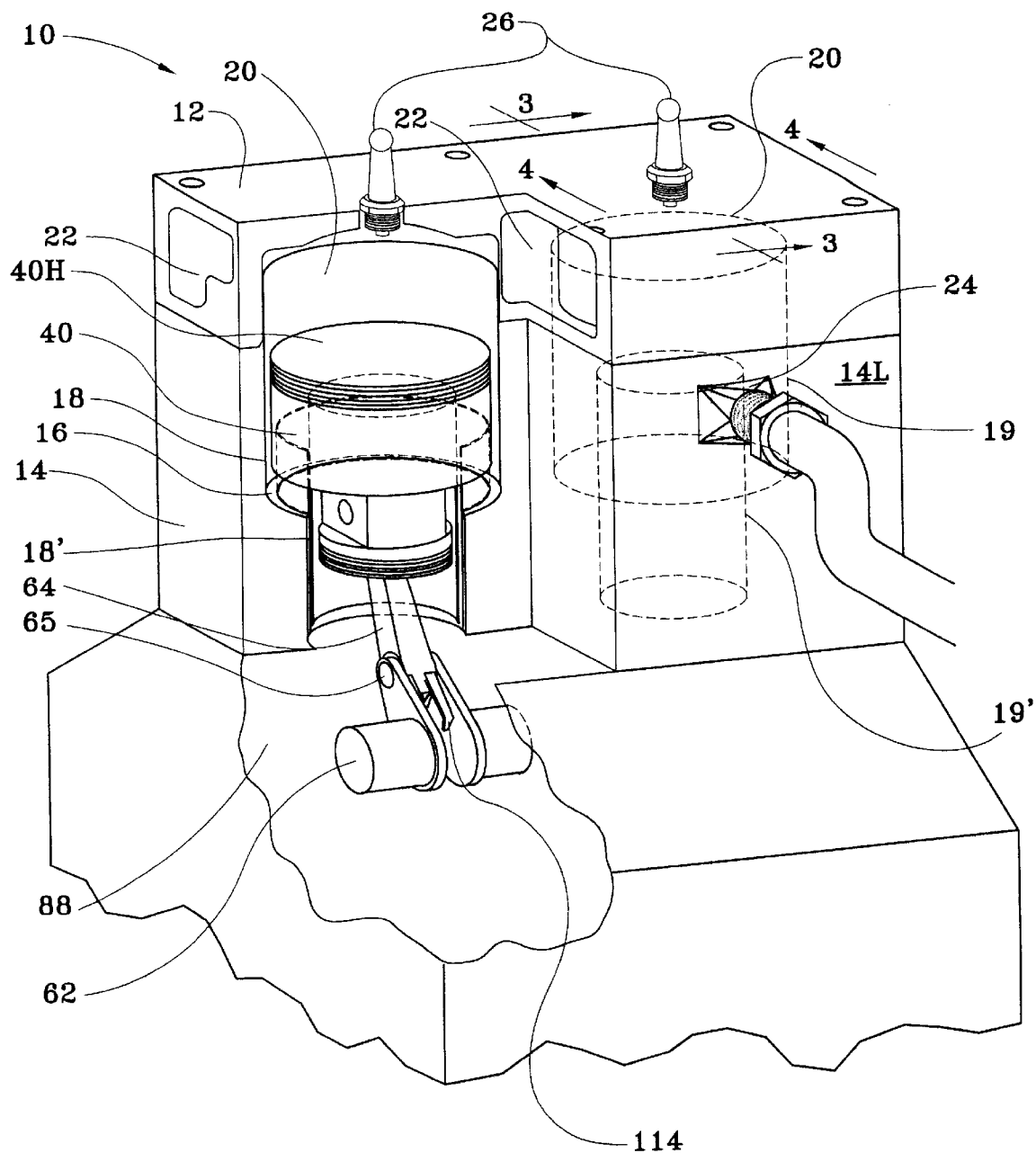
FIG. 2 is a partially cutaway, perspective view of an illustrative embodiment of a two-cylinder, in-line, water-cooled, two cycle engine that includes my reduced volume scavenging system.
Figure 3:
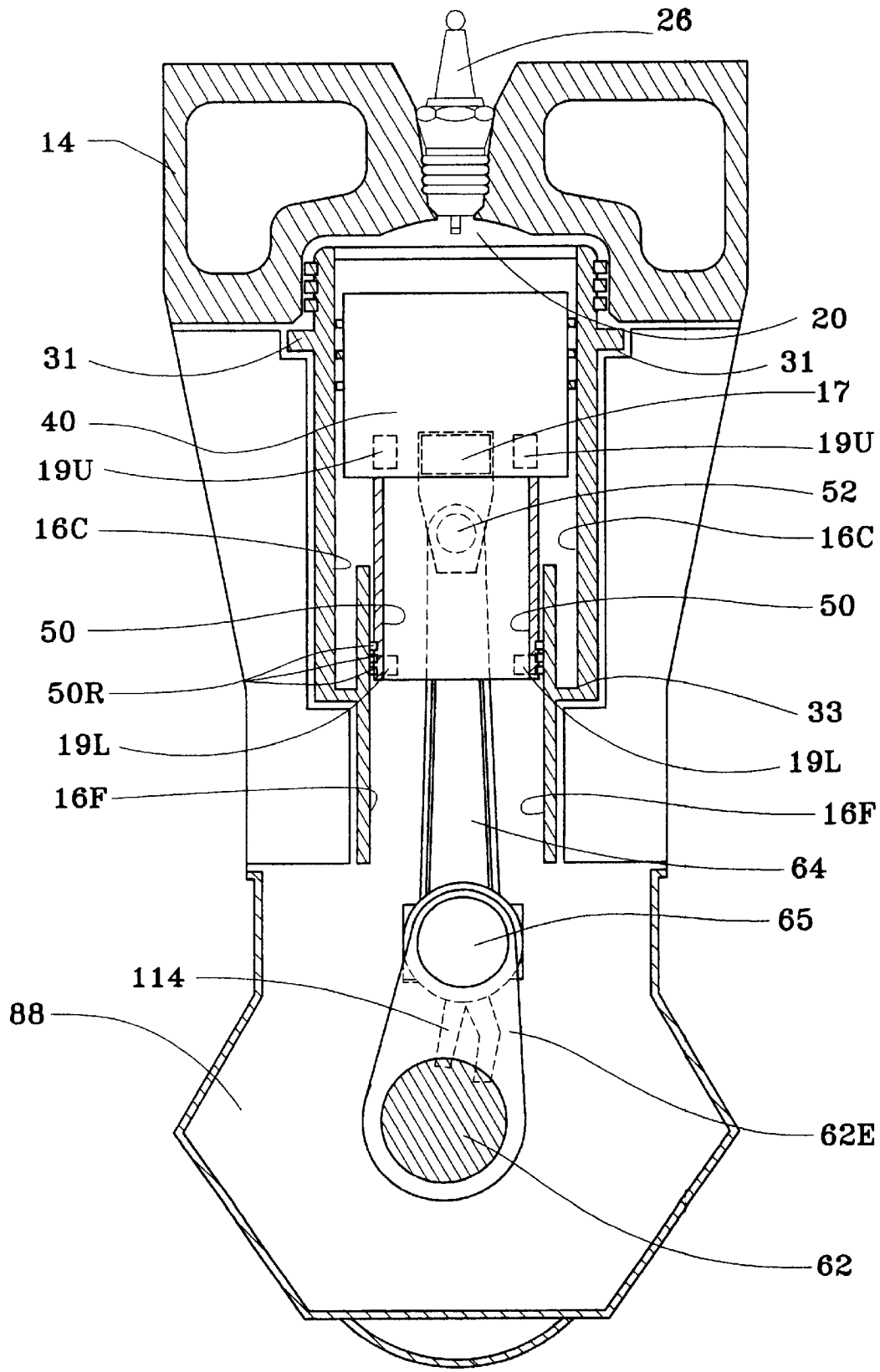
FIG. 3 is a transverse, cross-sectional view thereof along lines 3—3 of FIG. 2.
Figure 4:
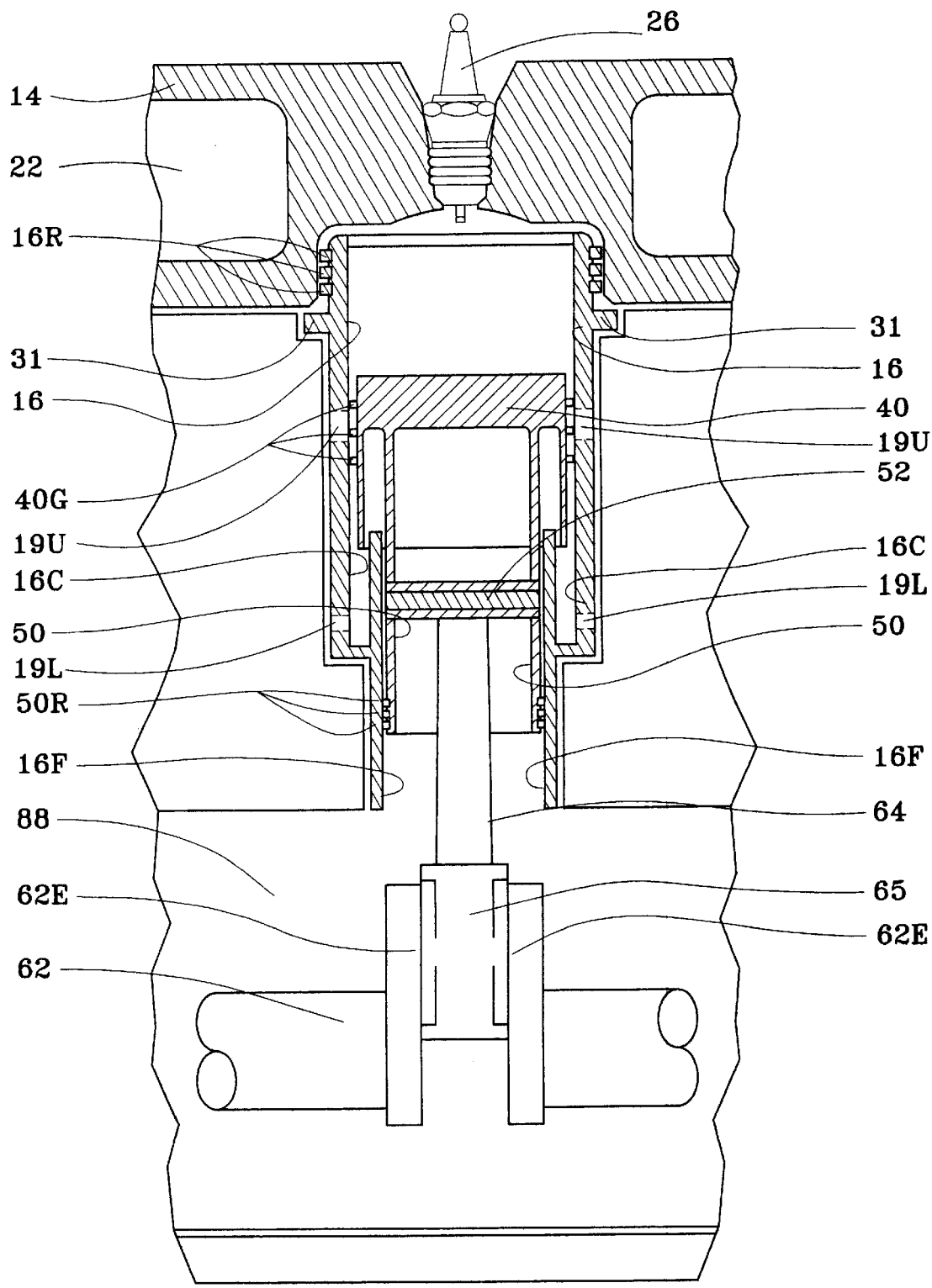
FIG. 4 is a longitudinal, cross-sectional view thereof along lines 4—4 of FIG. 2.

Referring to FIG. 2, a partially assembled, two cylinder, water-cooled, in line, two cycle engine, denoted generally by the numeral 10, is depicted in perspective view with a front and left side portion of the cylinder head 12 and engine block 14 cut away, thereby exposing to view a fixed sleeve 16 disposed within cylinder number 1 (shown in phantom outline), cylinder number 1 comprising an upper bore 18 and a coaxial, reduced-diameter, lower bore 18'. Also exposed to view in the cutaway in FIG. 2 are a crankshaft 62 and piston rod 64, and an oil slinger 114 attached to the crankshaft 62 for rotation therewith, all within a crankcase 88. The interior of the crankcase Cylinder number 2, adjacent cylinder number 1, similarly has an upper bore 19 and a coaxial, reduced-diameter lower bore 19' (shown in phantom outline). Overlying each of the upper cylinder bores 18, 19, and communicating therewith, is a combustion chamber 20 formed in the engine head 12; a spark plug 26 is provided for each combustion chamber 20. Water cooling passages 22 in the head 12 surround each combustion chamber 20. An engine exhaust duct 24 is provided for each cylinder 18, 19 and mounted on the left wall 14L of the engine block 14 in communication with an exhaust port 30 in the adjacent cylinder wall 14W.

A piston 40 is disposed for reciprocating movement within each fixed sleeve 16. As may best be seen in FIGS. 7 and 8A through 8E, each piston 40 has a circular head 40H down from which extends a hollow, cylindrical skirt 40S, open at the bottom. The external diameter of the piston skirt 40S corresponds to the internal diameter of the fixed sleeve 16. The piston skirt 40S has piston ring grooves 40G for mounting compression rings (two are shown). Coaxial and internal to each piston skirt 40S is a sliding sleeve 50 that extends down from the piston head 40H and into the lower, reduced-diameter cylinder bore 18', 19'. A lower end portion of the sliding sleeve 50 has ring grooves 50G for mounting compression rings 50R. The sliding sleeve 50 is sufficiently long that the compression rings 50R maintain sliding contact with, and seal, the reduced-diameter cylinder bore throughout the length of travel of the piston 40, and thereby substantially prevent blowby gases from entering into the crankcase 88. Intermediate its length, the sliding sleeve 50 has a transverse bore 50B through which is inserted a wrist pin 52 that pivotally connects an upper end of a connecting rod 64 to the sliding sleeve 50, and thus to the piston 40. An opposite, lower end of the connecting rod 64 is pivotally journalled on a crankpin 65 carried by a spaced-apart pair of eccentric arms 62 mounted for rotation on a crankshaft 62.

Figure 5:
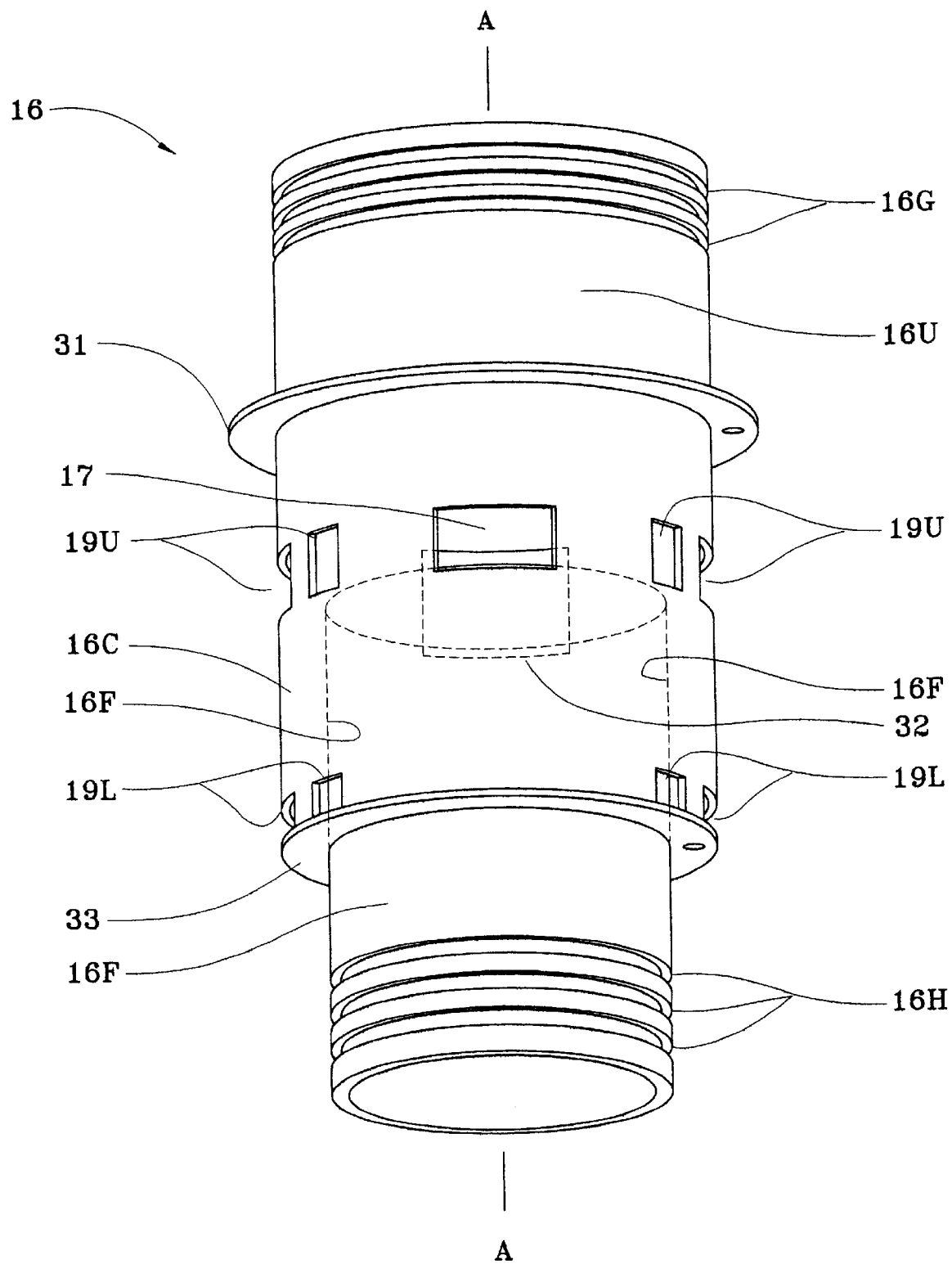
FIG. 5 is a perspective view of a fixed sleeve of my scavenging system.
Figure 6:
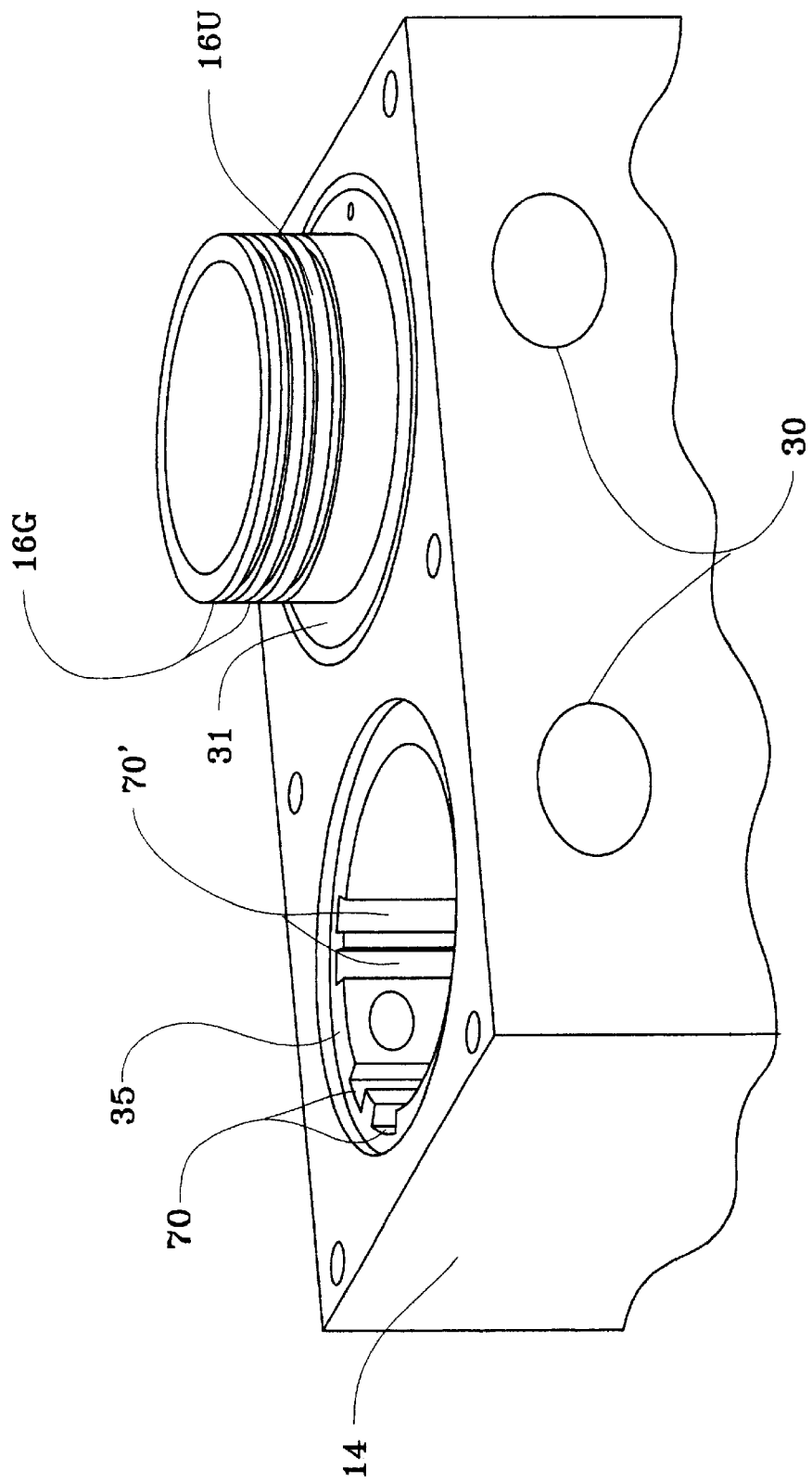
FIG. 6 is a fragmentary, perspective view of an upper portion of the block of the engine of FIG. 2 with the engine head removed.
Figure 7:
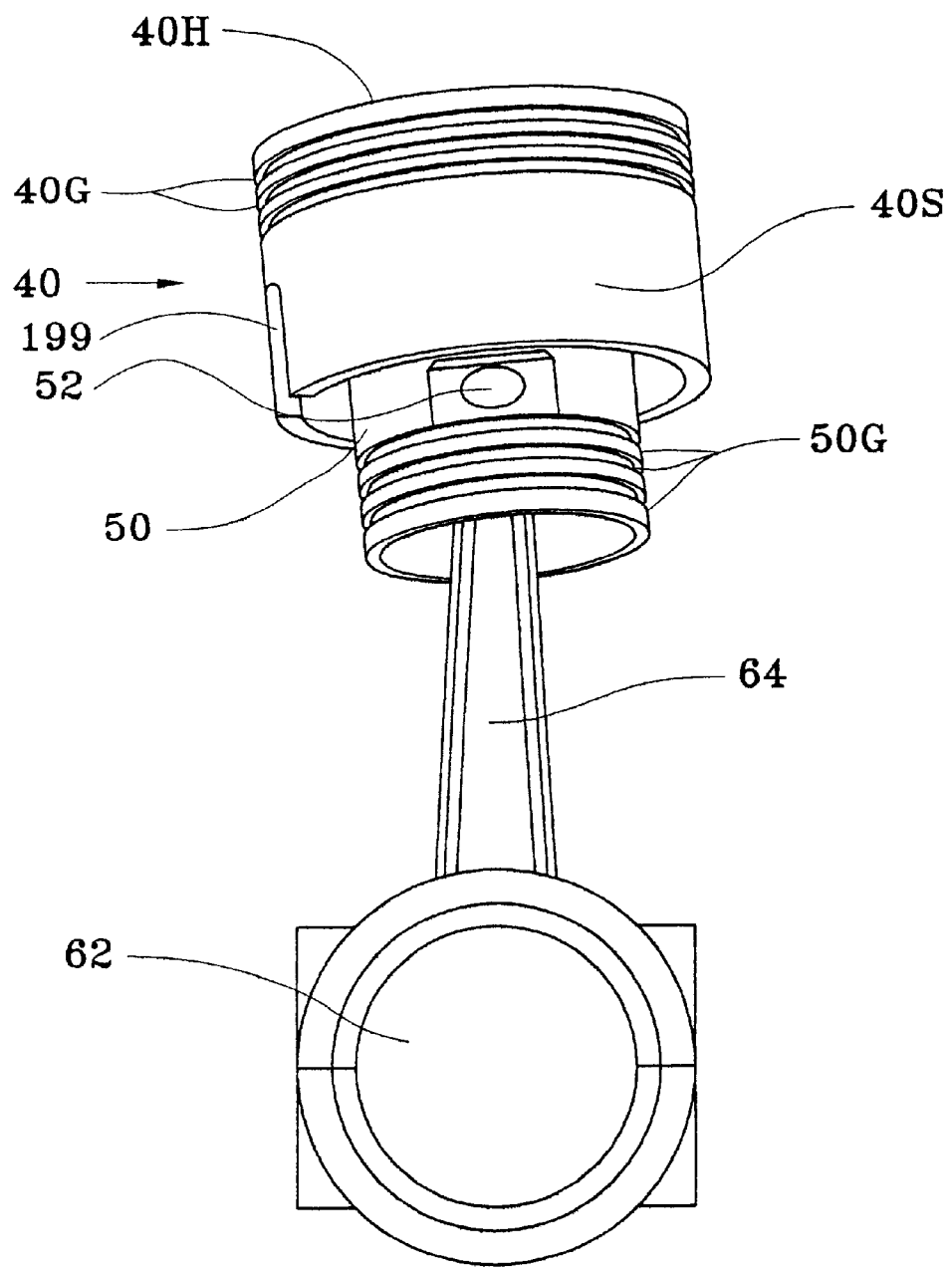
FIG. 7 is an enlarged, transverse, cross-sectional view of the crankshaft shown in FIG. 3 and a perspective view of the piston rod and piston attached thereto.

As may best be seen in FIGS. 5 and 6, the fixed sleeve 16 includes an upper cylindrical extension 16U that protrudes above the engine block 14 and into the cylinder head 12. The cylindrical extension 16U has a set of ring grooves 16G upon which are seated compression rings 16R. The combination of the upper cylindrical extensions 16U and rings 16R eliminates the need for a sealing gasket between the engine block 14 and cylinder head 12. The sleeve 16 also includes a cylinder bore liner 16C that is coaxial and integral with the upper cylindrical extension 16U. The liner 16C lines the upper cylinder bore 18, 19, and has an intake opening 17 in registry with an inlet port 25 in the upper cylinder bore 18, 19—which, in the engine depicted in FIG. 2, are on the left side of the upper cylinder bores 18, 19. The intake opening 17 communicates with a carburetor (not shown) for introducing air-fuel mixture into the upper cylinder bores 18, 19. Two pairs of circumferentially spaced-apart, transfer port passageways 70, 70', disposed on opposite sides of the inlet port 25, are recessed into, and extend axially the length of, each upper cylinder bore 18, 19. Upper and lower pairs of circumferentially spaced-apart scavenging openings 19U, 19L, are cut out of the liner 16C on the intake opening 17 side thereof, and are in registry with the transfer port passageways 70, 70'. Each upper cylinder bore 18, 19 has an exhaust port 30 disposed diametrically opposite the inlet port 25, but extending axially somewhat closer to the combustion chamber 20; thus, during an out stroke, the piston 40 will at least partially uncover the exhaust port 30 before it will uncover the inlet port 25 (see, for example, FIGS. 8C–8E). Each fixed sleeve 16 likewise has a cut away exhaust opening 32 diametrically opposite the inlet opening 25, and axially extended toward the combustion chamber 20, in registry with the exhaust port 30.

The fixed sleeve 16 further includes a reduced-diameter, lower cylindrical extension 16F that is coaxial with, and extends down from the liner 16C into the lower, reduced-diameter cylinder bore 18', 19'. The fixed sleeve 16 also includes an annular flange 31 that is coaxial with, and attached to, an upper portion of the liner 16C, the flange 31 being seated in an annular recess 35 in an upper surface of the block 14. The annular recess 35 is axially-aligned with and circumposed about the top of the upper cylinder bore 18, 19. The fixed sleeve 16 further includes an annular base 33 that is coaxial with, and attached to, a lower portion of the liner 16C and to an intermediate portion 16F' of the lower cylinder bore extension 16F. In a first embodiment of my scavenging system, as depicted in FIG. 5, the annular base 33 is normal to axis A—A.

Figure 1A:
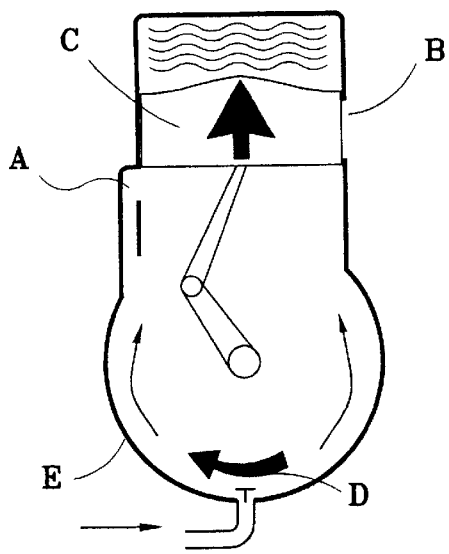
FIG. 1A is a schematic diagram of a lateral cross section through a one cylinder, two cycle engine of the prior art, showing an in stroke of the piston (C) causing compression of an air-fuel charge trapped in the upper cylinder or combustion chamber (exhaust port (B) being covered and closed), accompanied by the opening of an intake port (D), permitting fresh air-fuel charge into the crankcase (E)
Figure 1B:
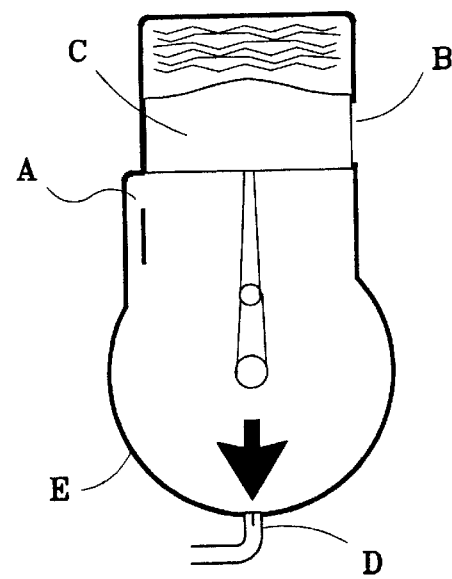
FIG. 1B is a schematic diagram thereof during ignition of the air-fuel mixture.
Figure 1C:
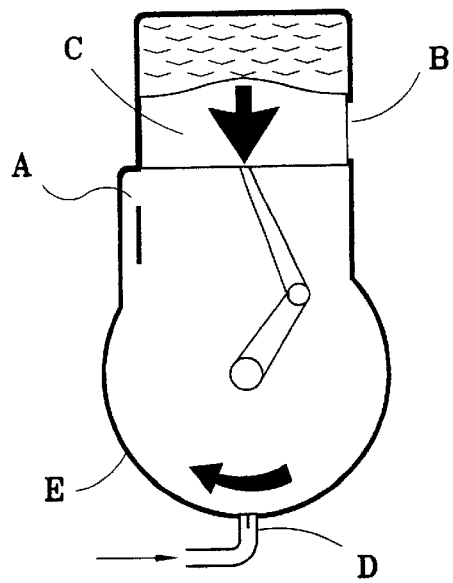
FIG. 1C is a schematic diagram thereof during the power stage, showing the exhaust port both covered and closed while burning air-fuel mixture drives the piston through an out stroke with resulting pressure build up in the crankcase, causing the intake port to close.
Figure 1D:
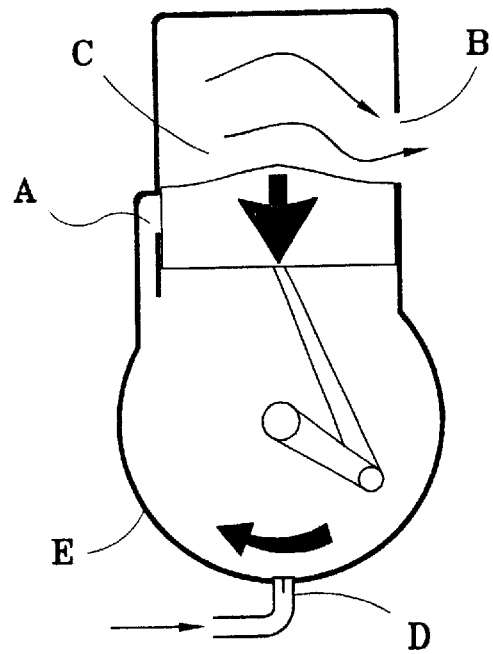
FIG. 1D is a schematic diagram thereof during exhaust, showing the piston continuing the out stroke, which leaves the inlet port covered and closed, and the exhaust port B uncovered and open, and maintains the intake valve closed.
Figure 1E:
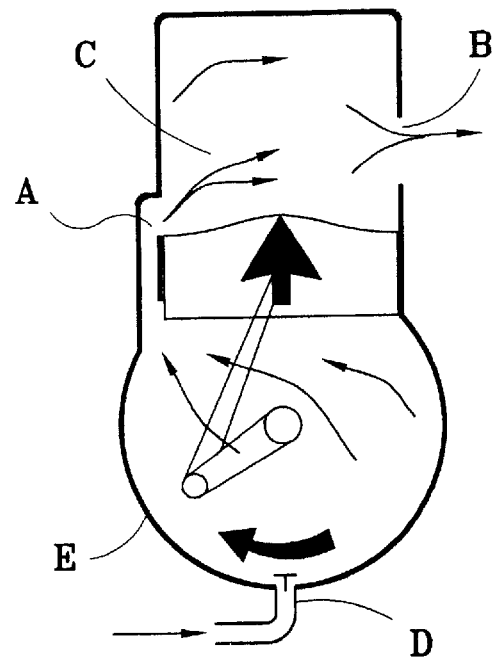
FIG. 1E is a schematic diagram thereof during intake, which occurs near the end of the out stroke, showing the inlet port uncovered and open, permitting air-fuel mixture to pass from the crankcase into the combustion chamber, while the exhaust port remains open, creating a cross flow for scavenging burnt gases out of the combustion chamber, preparatory to the next stage of the Otto cycle—the compression stage.
Figure 8A:
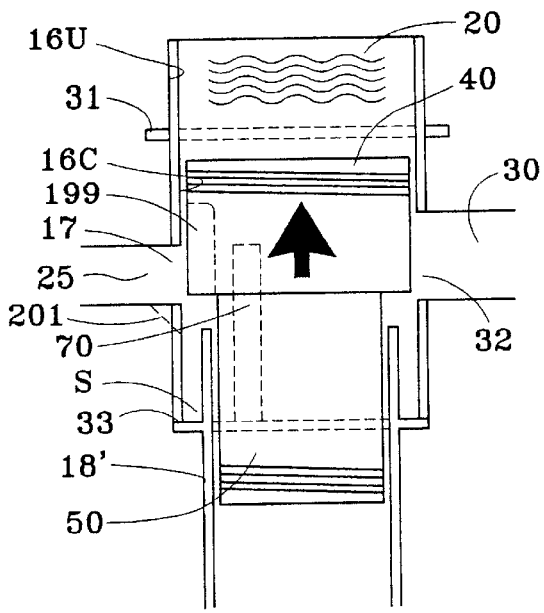
FIG. 8A is a schematic diagram of one cylinder of the two-cycle engine of FIG. 2 at the compression stage.
Figure 8B:
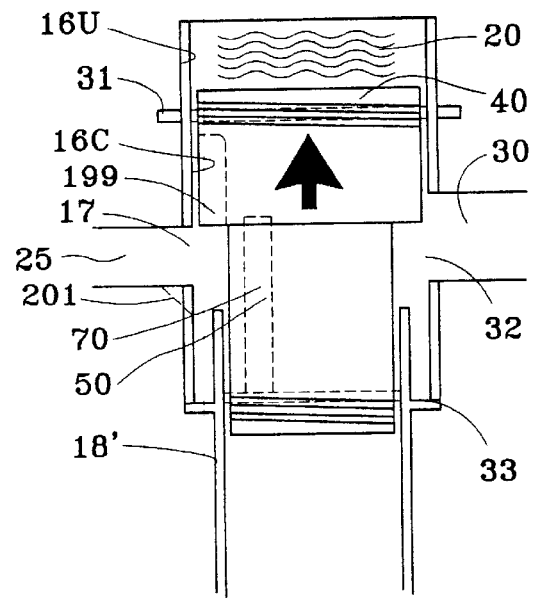
FIG. 8B is a schematic diagram thereof at the ignition stage
Figure 8C:
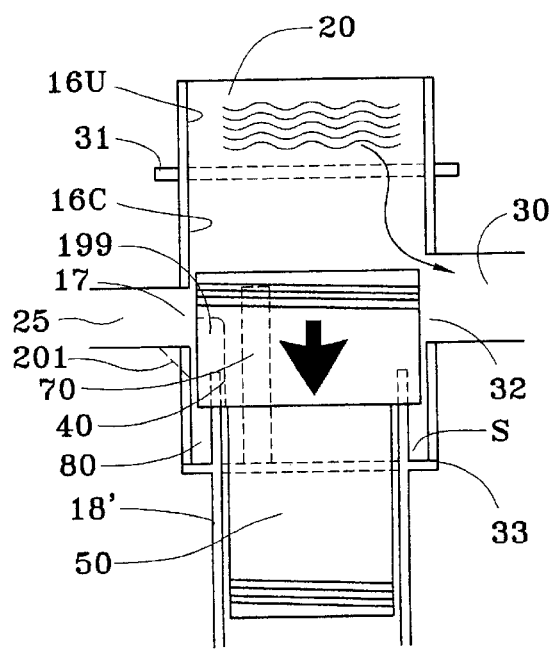
FIG. 8C is schematic diagram thereof at the power stage.
Figure 8D:
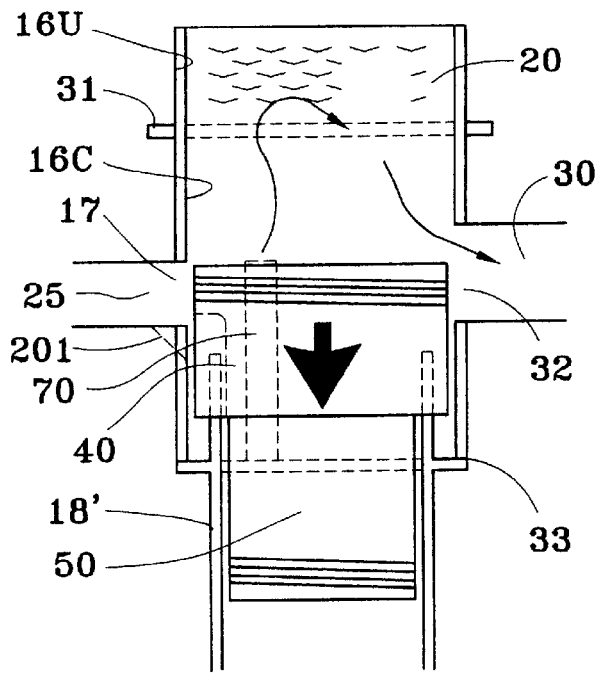
FIG. 8D is a schematic diagram thereof at exhaust stage.
Figure 8E:
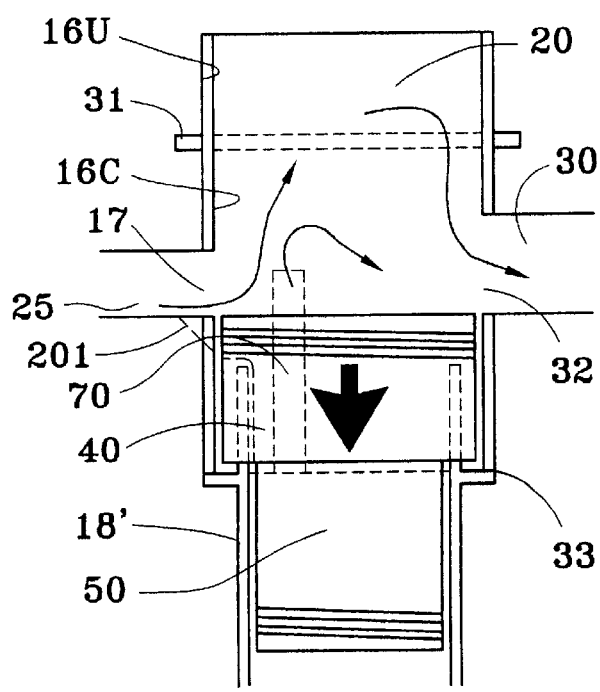
FIG. 8E is a schematic diagram thereof at the intake stage, with simultaneous vacuum/ram effect for enhanced scavenging of gases.

In the compression stage (FIG. 8A), the piston 40 during its in stroke blocks intake port 17 and exhaust port 30, thereby trapping and compressing air-fuel mixture in the combustion chamber 20. The ignition stage (FIG. 8B) immediately follows while those ports remain blocked by the piston 40, giving rise to the power stage (FIG. 8C), wherein the burning air-fuel mixture drives the piston 40 through its out stroke. The exhaust stage (FIG. 8D) follows as the piston 40 moves away from the combustion chamber 20 and past the exhaust port 30, and burnt gases rush out the exhaust port 30. Meanwhile, the intake port 17 remains closed and the piston begins compressing fresh air-fuel mixture 80 in the space between the piston 40 and the annular base 33; this forces the fresh air-fuel mixture up the transfer passageways 70, 70', through the upper scavenging ports 19U and into the combustion chamber 20, pushing remaining burnt gases out of the chamber 20 (FIG. 8D). As the piston 40 completes its out stroke (FIG. 8E), the piston 40 passes by and uncovers the intake port 17. The motion of the piston 40 creates a vacuum above the piston, which sucks fresh air-piston 40 creates a vacuum above the piston, which sucks fresh air-fuel mixture through the intake port 17 and directly into the combustion chamber 20, thereby forcing any remaining burnt gases out of the compression chamber—a vacuum ram effect—thus completing one cycle, ready for the next compression stage. During the intake stage, the fuel-air mixture 100 is conducted from the intake port 25 angularly downward through a lower intake block transfer port 201, and thence through an adjacent piston skirt cutout 199 into the space between the piston 40 and the annular base 33 of the fixed sleeve. Comparing FIGS. 8C, 8D and 8E, with FIGS. 1C, 1D and 1E, respectively, it may be seen that, in comparison to the prior art, my scavenging system substantially reduces the volume of the fresh air-fuel mixture 80 that is compressed during each out stroke of a piston 40 from the entire crankcase volume down to the space between the annular base 33 and the piston 40.

Figure 11:
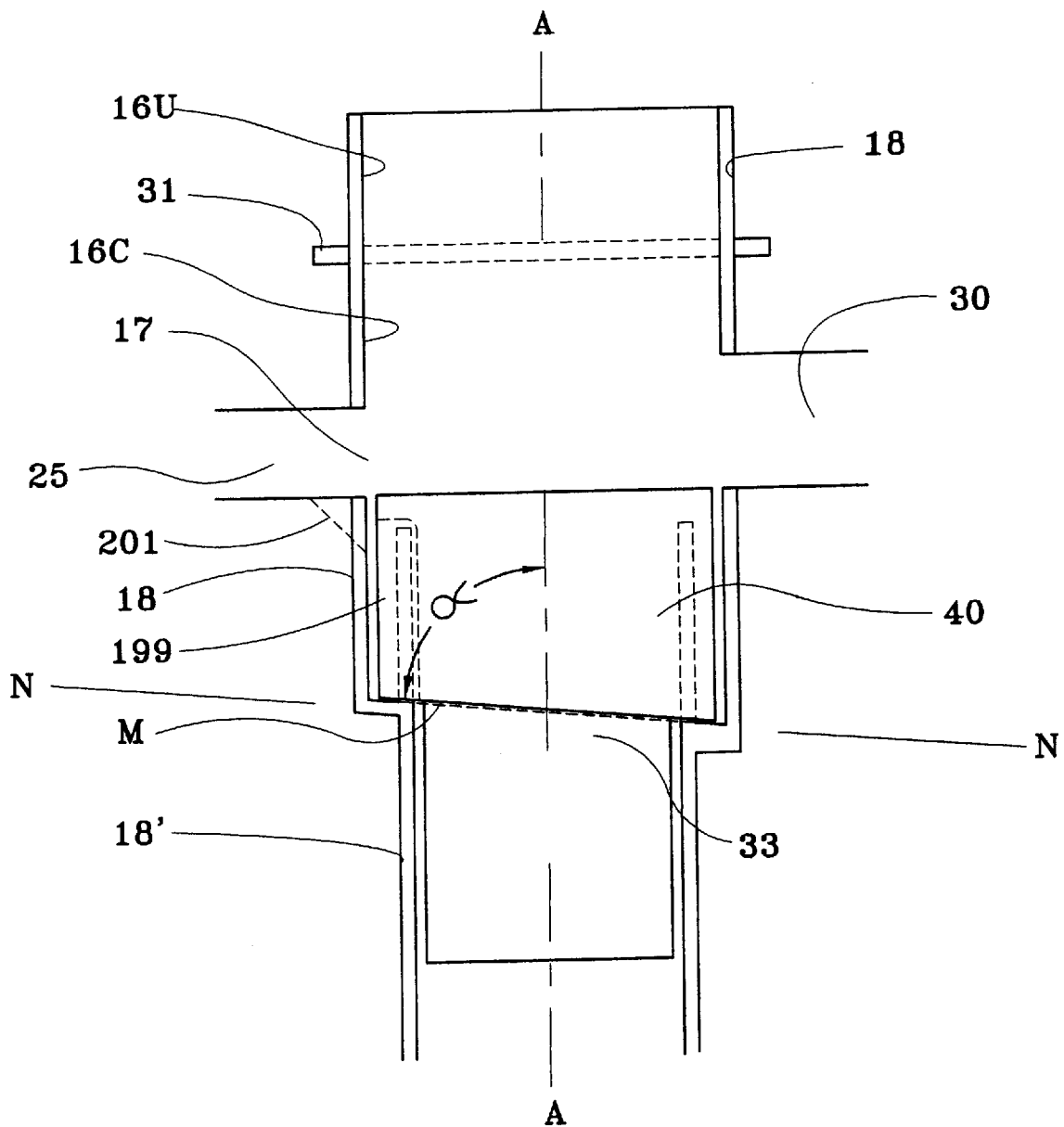
FIG. 11 is a schematic diagram of one cylinder of a two cycle engine incorporating an alternative embodiment of my scavenging system, wherein a lower margin M of the piston skirt is canted away from normal to the cylinder axis A—A to increase volumetric efficiency of scavenging.

In an alternative embodiment, depicted in FIG. 11, a lower margin M of the skirt 40S of each piston 40 is canted away from normal to the cylinder axis A—A, as is the annular base 33 of the fixed sleeve 33. For a given upper cylinder bore diameter, this provides an increased swept volume as the piston 40 commences an in stroke, thereby providing increased volumetric efficiency of scavenging burnt gases. This angle alpha is preferably between 45 and 90 degrees.

Figure 9:
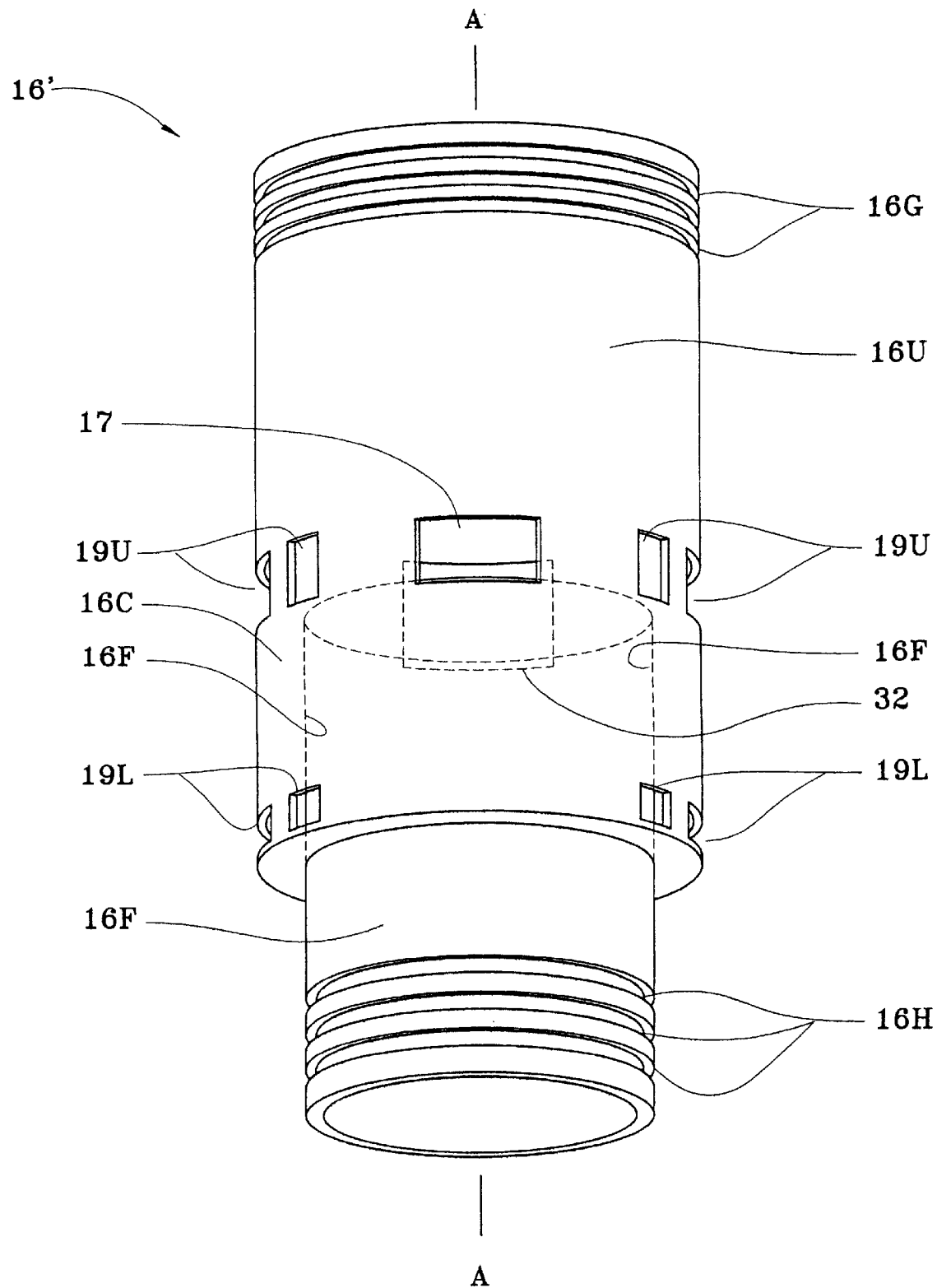
FIG. 9 is a perspective view of a second, alternative embodiment of the fixed sleeve.
Figure 10:
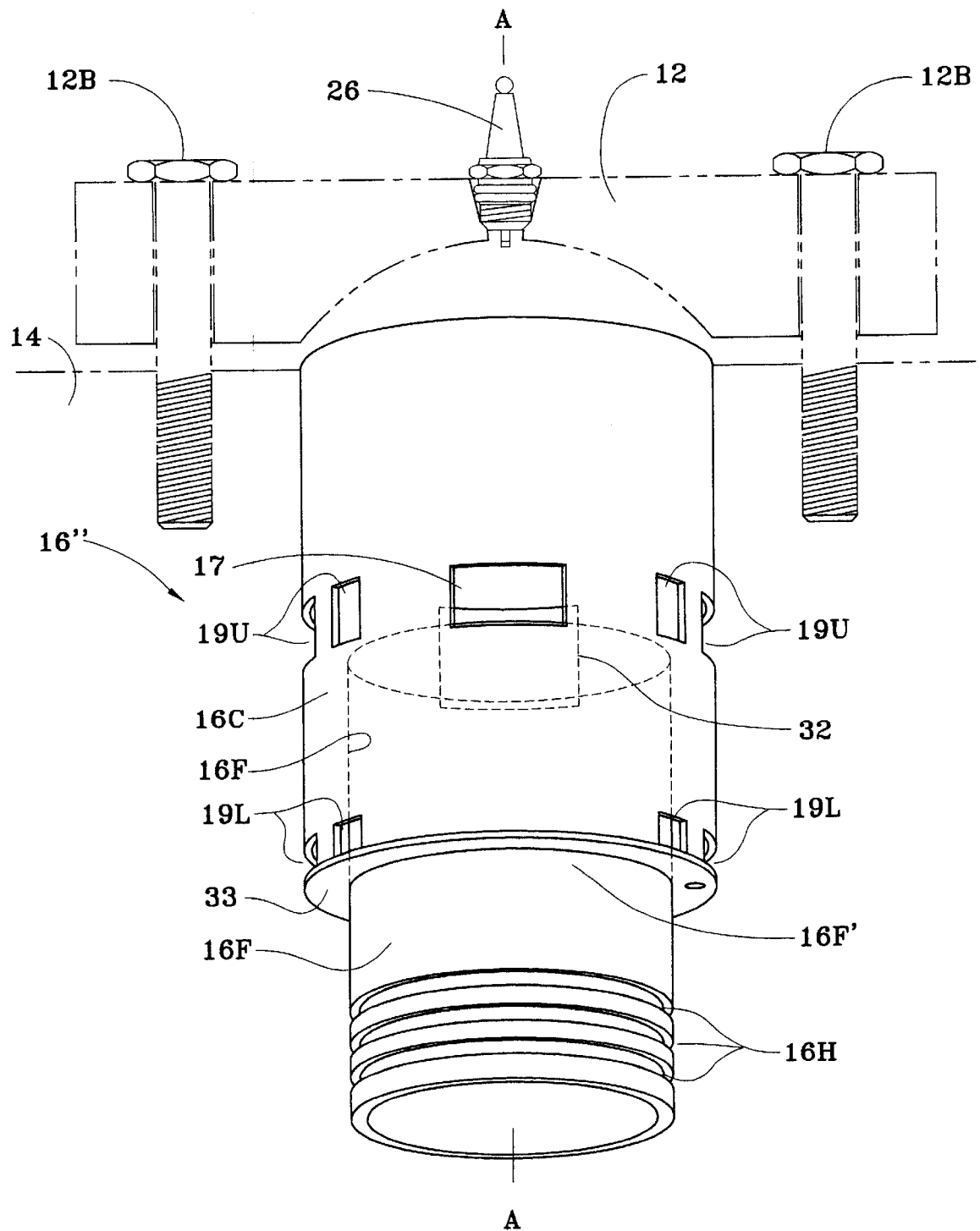
FIG. 10 is a perspective view of a third, alternative embodiment of the fixed sleeve in which an upper extension thereof bears no ring grooves (engine head is shown in phantom outline).

The flange 31, which is for mechanical stability, is optional, and can be eliminated, resulting in an alternative form of the fixed sleeve 16' depicted in FIG. 9. Moreover, the upper cylindrical extension 16U and associated rings 16R, 16L, can also be eliminated, resulting in the fixed sleeve 16" depicted in FIG. 10; provided that, in that case, a sealing gasket (not shown) must be interposed between an upper surface of the block 14 and a lower surface of the cylinder head 12 (depicted in FIG. 10 in phantom outline attached to the block by bolts 12B).

Figure 12:
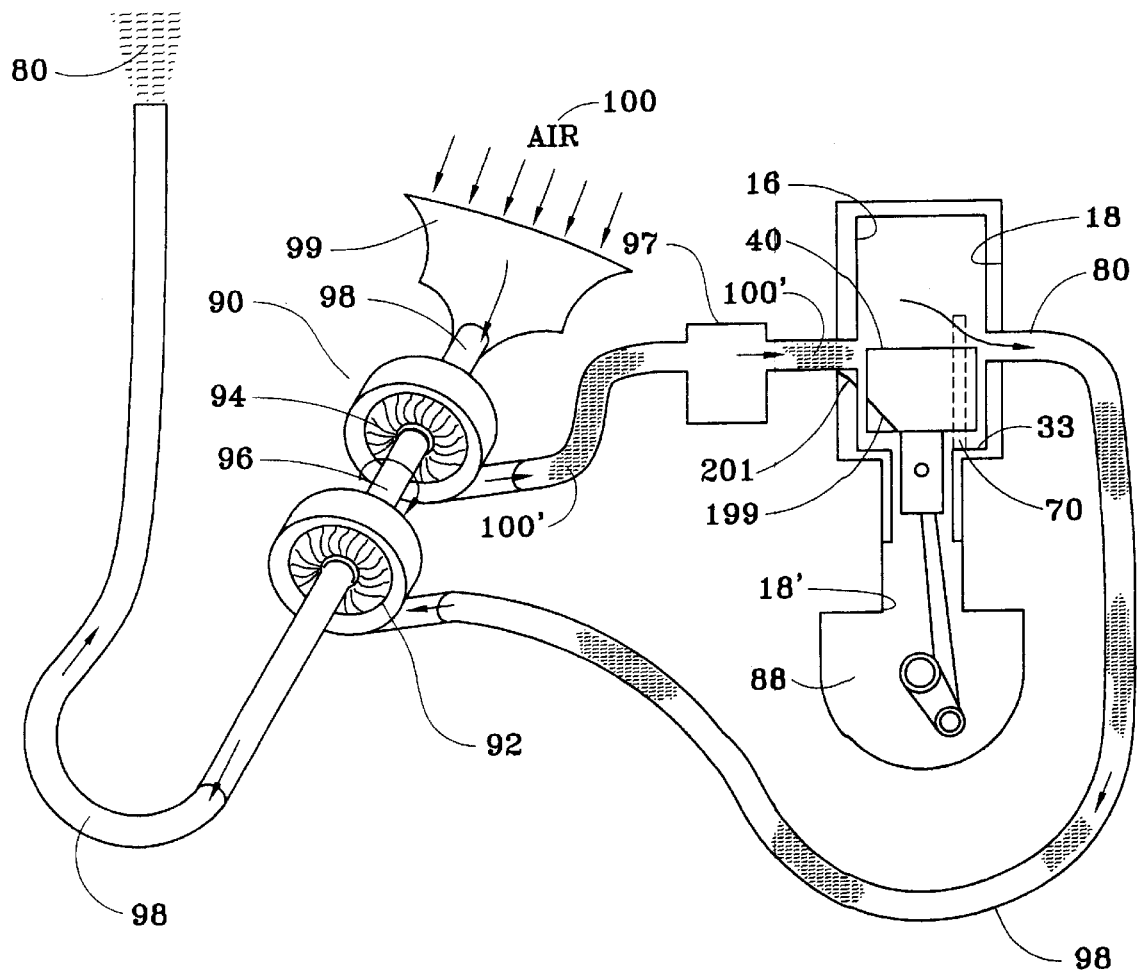
FIG. 12 is a schematic diagram of a turbocharger coupled to an upper cylinder bore of the engine depicted in FIG. 2.

For increased horsepower or improved fuel efficiency, a turbocharger 90 may be coupled to the engine 10 for increased air schematically in FIG. 12. Hot exhaust gases 80 are directed through an intake impeller 92 of the turbocharger 90, thereby driving an output impeller 94 coupled to a common shaft 96, which draws fresh air 100 through air intake 99 and conduit 98, and pressurizes it and sends it on to a curburetor 97, where the air is mixed with fuel, and thence into upper cylinder bore(s) 18, 19. Due to heat transfer that occurs within the turbocharger 90, the air 100 is heated as well as pressurized, which makes it unsuitable for insertion into the crankcase of a conventional two cycle engine. The two cycle engine 10 described herein, however, is ideally suited for receiving such heated, tubocharged air-fuel mixture 100' directly into the upper cylinder bores 18, 19, wherein the mixture 100' is conducted angularly downward through a lower intake block transfer port 201, and thence through an adjacent piston skirt cutout 199 into the space between the piston 40 and the annular base 33 of the fixed sleeve.

Figure 13:
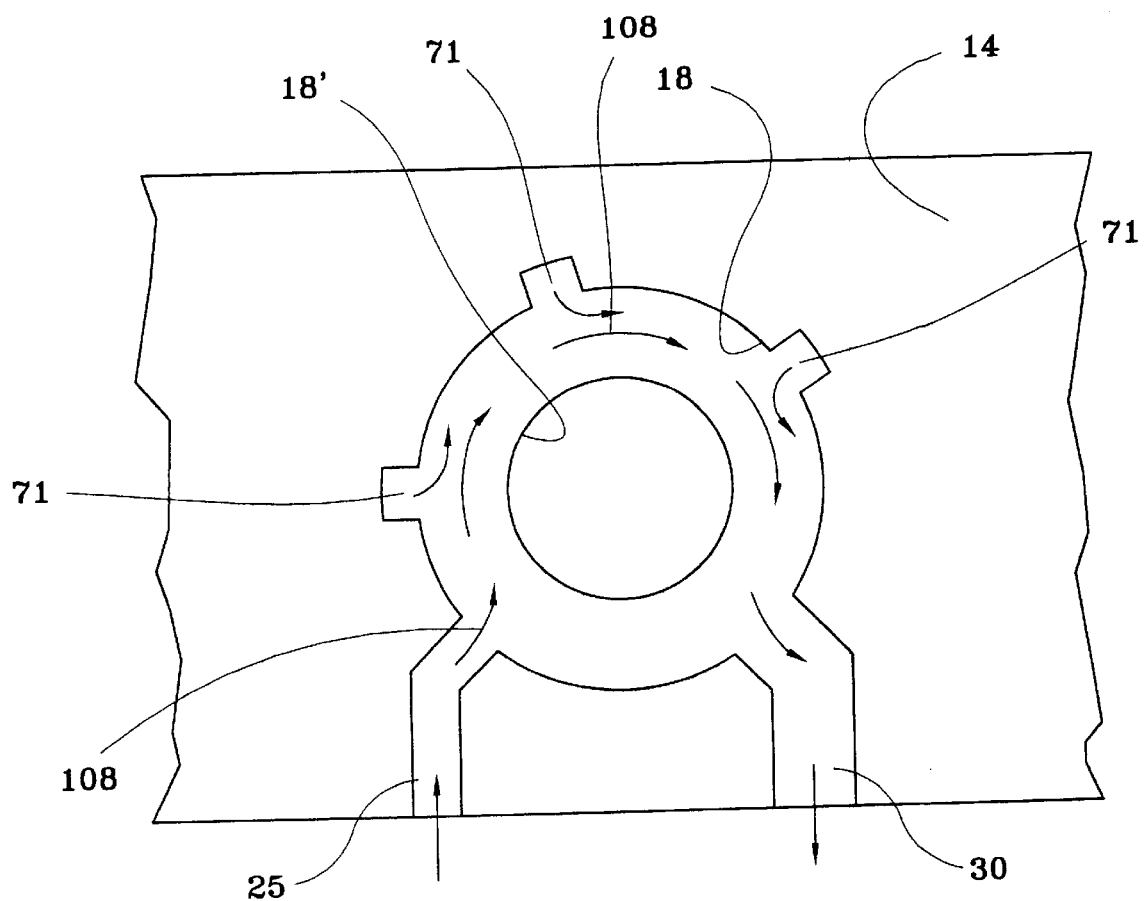
FIG. 13 is a schematic, fragmentary, top view of the exposed block of a two cycle engine showing swirl scavenging (piston is omitted for clarity) within an upper cylinder bore.
Figure 14:
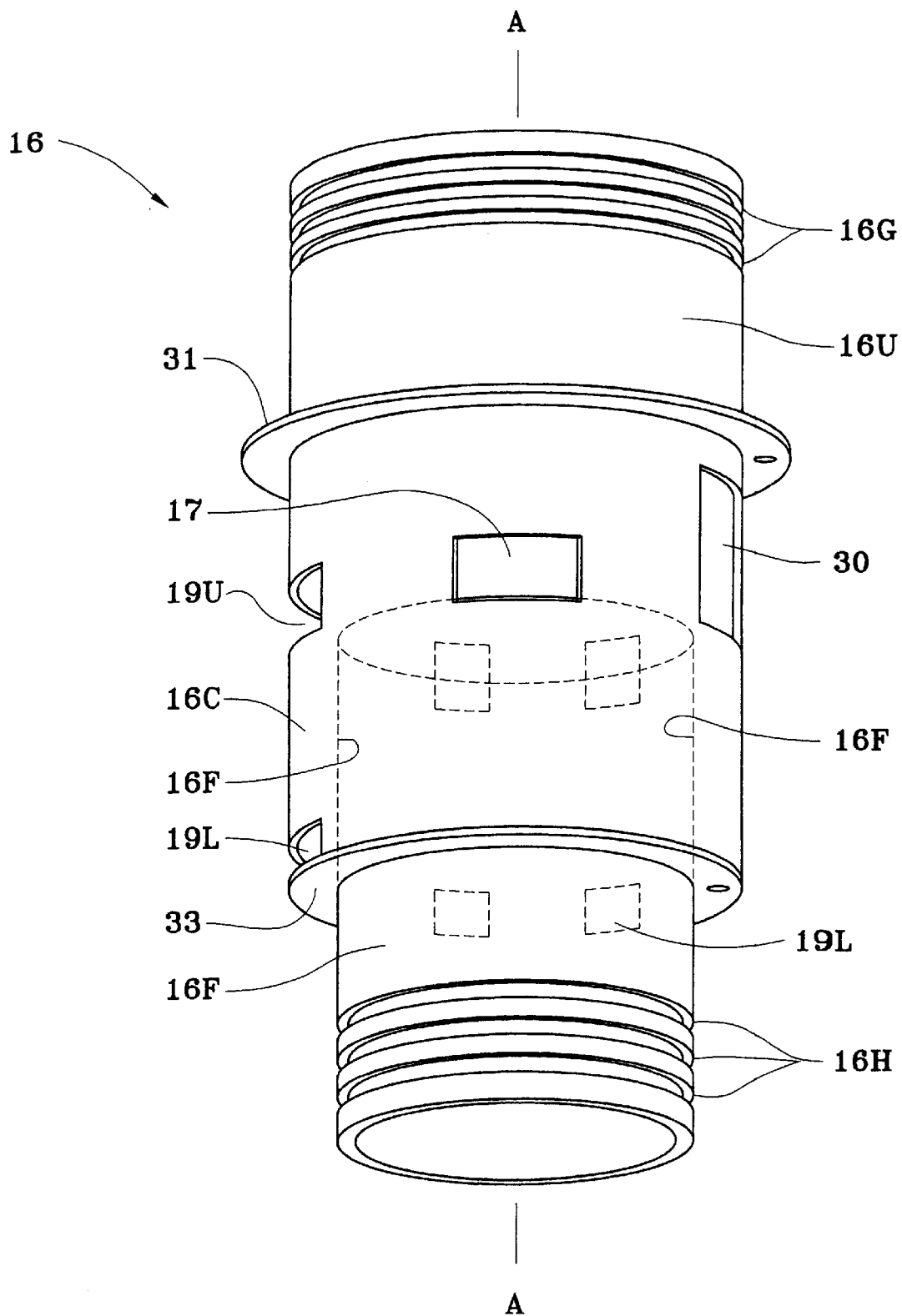
FIG. 14 is a perspective view of a fourth, alternative embodiment of a fixed sleeve in which the intake, exhaust, and upper and lower scavenging openings are disposed for registry with the inlet and outlet ports, and the transfer port passageways, respectively, of the upper cylinder bore shown in FIG. 13.

In the embodiment depicted in FIGS. 2–12, each cylinder 18, 19 has just one intake port 25 and one exhaust port 30, corresponding to which the fixed sleeve 16 has just one intake opening 17 and one exhaust opening 32. For two cycle engines having cylinders with more than one intake port and/or more than one exhaust port, the fixed sleeve 16 is modified to incorporate additional intake and exhaust openings in registry with the additional intake and exhaust ports. Each cylinder in the illustrated embodiment has an exhaust port diametrically opposite to an intake port for cross flow scavenging; but, my scavenging system is not limited to cross flow scavenging and may be adapted for other cylinder port arrangements. For example, for swirl scavenging (indicated by arrows 108) wherein the intake port 25 is adjacent to the exhaust port 30, as depicted schematically in FIG. 13, the intake opening 17 and the exhaust opening 32 in the fixed sleeve 16 are likewise adjacent, instead of diametrically opposite, as shown in FIG. 14; similarly, the sleeve 16 has upper and lower scavenging openings (FIG. 14) disposed for registry with recessed transfer port passageways 71 (FIG. 13).

The preferred material for the fixed sleeve 16 will vary with engine application and may include low carbon steel, high carbon steel, titanium steel or chromoloy steel. The preferred material for the reciprocating sleeve 50 likewise will vary with engine application, will ordinarily be the same as that of the piston skirt 40S, and made from an appropriate alloy metal. If the lower cylinder extension of the fixed sleeve 16 is inserted into the lower cylinder bore by a light press fit or an interference fit, the lower cylinder extension should bear ring grooves and compression rings to minimize blowby; however, if the insertion is by high press fit, those will not be necessary.

It will be appreciated that various modifications can be made to the exact form of the present invention without departing from the scope thereof. My scavenging system may be employed in engines having any number of cylinders. One cylinder applications may include, for example, the powering of chain saws, lawn mowers, lawn edgers, and other small appliances; multicylinder versions are suitable for powering mopeds, motorcycles, automobiles, trucks, motorboats, airplanes, trains and ships. Although the illustrated embodiment shows a spark ignition type engine, the scope of the invention includes compression ignition (diesel) two cycle engines as well, with substitution of fuel injectors for spark plugs together with such other necessary modifications as are known to persons of ordinary skill in the art. Similarly, the invention comprehends not only water cooled two cycle engines, but also air cooled two cycle engines. Furthermore, any two cycle engine that includes my scavenging system can also include a reed valve assembly as part of the inlet port assembly of each cylinder. It is accordingly intended that the disclosure be taken as illustrative only and not limiting in scope, and that the scope of the invention be defined by the following claims.

I claim:

1. A scavenging system for a two cycle, internal combustion engine having an engine block enclosing an engine crankcase, at least one cylinder and cylinder bore within the block, each cylinder having an upper cylinder bore in communication with, and aligned on a common axis A—A with, a lower, reduced-diameter cylinder bore, and, within the upper cylinder bore at least one inlet port, at least one exhaust port, and at least one axially-extended, transfer port passageway recessed into the upper cylinder bore for scavenging, a cylinder head mounted over the engine block at an upper end of each cylinder, a crankshaft and connecting rod assembly housed within the crankcase, a piston disposed for reciprocating motion within each upper cylinder bore and pivotally attached to a connecting rod, and four cycle engine lubrication means, comprising:

(a) a fixed sleeve within each cylinder, said sleeve including
   (1) a hollow, cylindrical liner, said liner coaxial with and lining the upper cylinder bore and having intake and exhaust openings in registry with the inlet and outlet ports, respectively, and axially spaced-apart, upper and lower scavenging openings in registry with each transfer port passageway, respectively;
   (2) a reduced-diameter, lower cylinder bore extension that is coaxial with the liner, said extension extending axially from the liner into the lower cylinder bore; and
   (3) an annular base that is coaxial with, and attached to, a lower portion of the liner and to an intermediate portion of the lower cylinder bore extension; and
(b) a reciprocating sleeve pivotally attached to a connecting rod for reciprocating movement within the lower cylinder bore extension, said sleeve being coaxial with, partially internal to, and attached to each piston, and extending from within the piston skirt into the lower cylindrical extension, said reciprocating sleeve having an external diameter slightly less than the internal diameter of said extension.

2. The scavenging system of claim 1, wherein the lower cylinder extension bears a first set of ring grooves and further comprising a first set of compression rings circumposed about the first set of ring grooves.

3. The scavenging system of claim 1, wherein the reciprocating sleeve bears a second set of ring grooves and further comprising a second set of compression rings circumposed about the second set of ring grooves.

4. The scavenging system of claim 1, wherein within each upper bore there is one inlet port and diametrically opposite said inlet port one exhaust port for cross flow scavenging.

5. The scavenging system of claim 1, wherein within each upper bore there is one inlet port and diametrically opposite said inlet port one exhaust port for cross flow scavenging, and said inlet port is flanked on opposite sides by pairs of circumferentially spaced-apart, axially-extended, transfer port passageways recessed into the upper cylinder bore, and the liner of each fixed sleeve has an intake opening in registry with said inlet port, an exhaust opening in registry with said exhaust port, and axially spaced-apart, upper and lower scavenging openings in registry with each of the transfer port passageways.

6. The scavenging system of claim 1, further comprising an annular flange that is coaxial with the liner and circumposed about an upper end thereof.

7. The scavenging system of claim 1, further comprising:
(a) a hollow, upper cylindrical extension that protrudes above the block and into the cylinder head, said extension bearing a third set of ring grooves; and
(b) a third set of compression rings circumposed about said third set of ring grooves.

8. The scavenging system of claim 1, wherein the base of the fixed sleeve and a lower margin of the skirt of the piston are normal to the axis A—A.

9. The scavenging system of claim 1, wherein the base of the fixed sleeve and a lower margin of the skirt of the piston are both canted at an angle alpha with respect to the axis A—A in order to increase the volumetric efficiency of scavenging.

10. The scavenging system of claim 9, wherein the angle alpha is between 45 and 90 degrees.

11. A two cycle, internal combustion engine, comprising:
(a) an engine block enclosing an engine crankcase;
(b) at least one cylinder within the block, each cylinder having an upper cylinder bore in communication and aligned on a common axis A—A with a lower, reduced-diameter cylinder bore, and, within the upper cylinder bore at least one inlet port, at least one exhaust port, and at least one axially-extended transfer port passageway recessed into the upper cylinder bore for scavenging;
(c) a cylinder head mounted over the engine block at an upper end of each cylinder;
(d) a crankshaft and connecting rod assembly housed within the crankcase;
(e) a piston disposed for reciprocating motion within each upper cylinder bore and pivotally attached to a connecting rod;
(f) four cycle engine lubrication means;
(g) a scavenging system that includes,
   (1) a fixed sleeve within each cylinder, said sleeve including
      (i) a cylinder bore liner that is coaxial with the upper cylinder bore, said liner lining the upper cylinder bore and having an intake opening in registry with each inlet port, an exhaust opening in registry with each exhaust port, and upper and lower scavenging openings in registry with each transfer port passageway;
      (ii) a reduced-diameter, lower cylinder bore extension that is coaxial with and attached to the liner, said extension extending axially from the liner into the lower cylinder bore;
      (iv) an annular base that is coaxial with, and attached to, a lower portion of the liner and to an intermediate portion of the lower cylinder bore extension; and
   (2) a reciprocating sleeve pivotally attached to a connecting rod for reciprocating movement within the lower cylindrical extension, said sleeve being coaxial with and attached to each piston, and extending from within the piston skirt into the lower cylindrical extension, said reciprocating sleeve having an external diameter slightly less than the internal diameter of said extension.

12. The engine of claim 11, wherein the lower cylinder extension bears a first set of ring grooves, and further comprising a first set of compression rings circumposed about the first set of ring grooves.

13. The engine of claim 11, wherein the reciprocating sleeve bears a second set of ring grooves, and further comprising a second set of compression rings circumposed about the second set of ring grooves.

14. The engine of claim 11, wherein the scavenging system therein further comprises an annular flange that is coaxial with the liner and cicumposed about an upper end thereof.

15. The engine of claim 11, wherein the scavenging system therein further comprises:
(a) an upper cylindrical extension that protrudes above the block and into the cylinder head, said extension bearing a third set of ring grooves; and
(b) a third set of compression rings.

16. The engine claim 11, wherein the base of the fixed sleeve and a lower margin of the skirt of the piston are normal to the axis AA.

17. The engine of claims 11, 12, 13, 14, 15, or 16, wherein the base of the fixed sleeve and a lower margin of the skirt of the piston are both canted at an angle alpha with respect to the axis A—A in order to increase the volumetric efficiency of scavenging.

18. The engine of claim 17, wherein the angle alpha is between 45 and 90 degrees.

19. The engine of claim 17, wherein the engine lubrication system includes an oil sump and an oil slinger within the crankcase.

20. The engine of claim 17, wherein the engine lubrication system includes an oil sump and an oil pump inside of the crankcase.

21. The engine of claim 17, wherein the engine lubrication system includes an oil sump and an oil pump external to the crankcase and communicating with the interior of the crankcase.

22. The engine of claim 18, further comprising turbocharger means coupled to the engine for forcing air under pressure into each upper cylinder bore thereof when the engine is in operation.

23. A fixed sleeve for lining a duplex cylinder within a two cycle internal combustion engine, said duplex cylinder having an upper cylinder bore aligned on a common axis A—A with a lower, reduced-diameter cylinder bore and in communication therewith, the upper bore thereof having an inlet port and an exhaust port, and the inlet port being flanked on opposite sides by axially extended, transfer port passageways recessed into the upper cylinder bore for cross flow scavenging, comprising:

(a) a hollow, cylindrical liner, said liner having intake and exhaust openings and upper and lower scavenging openings adapted to align in registry with the inlet port, exhaust port, and transfer port passageways, of the upper cylinder bore, respectively;

(b) a reduced-diameter, lower cylinder bore extension that is coaxial with the liner, said extension adapted for extending axially into the lower cylinder bore, and bearing a first set of ring grooves; and (c) an annular base that is coaxial with, and attached to, a lower portion of the liner and to an intermediate portion of the lower cylindrical extension.

24. The fixed sleeve of claim 23, further comprising an annular flange that is coaxial with the liner and cicumposed about an upper end thereof.

25. The fixed sleeve of claim 24, further comprising:

(a) an upper cylindrical extension adapted to protrude above the block of the engine and into the cylinder head thereof, said extension bearing a third set of ring grooves; and (b) a compression ring circumposed about each ring groove.

26. The fixed sleeve of claim 23, wherein the base of the fixed sleeve is normal to the axis A—A.

27. The fixed sleeve of claim 23, wherein the base of the fixed sleeve is canted at an angle alpha with respect to the axis A—A.

28. The fixed sleeve of claim 24, wherein the angle alpha is between 45 and 90 degrees.

29. For use in an internal combustion engine that embodies at least one duplex cylinder having an upper cylinder bore and coaxial therewith a lower, reduced-diameter cylinder bore, and a connecting rod and crankshaft assembly housed within an engine crankcase, a combination piston and reciprocating sleeve for reciprocating motion within said upper cylinder bore, said combination comprising:

(a) a piston having a disc-shaped head, a cylindrical skirt depending from said head, a transverse bore for receiving a wrist pin, and compression ring grooves circumposed about the skirt;

(b) a reciprocating sleeve adapted for reciprocating movement within said lower cylinder bore and having an external diameter corresponding to the internal diameter of said bore, said sleeve being coaxial with, partially internal to, and attached to the piston, and extending axially away from the piston head beyond said skirt.

30. The combination of claim 29, wherein the reciprocating sleeve has one or more ring grooves.

* * * * *